(12) United States Patent  
Dawson et al.

(10) Patent No.: US 8,823,708 B2  
(45) Date of Patent: Sep. 2, 2014

(54) TELEPORT PREVIEW PROVISIONING IN VIRTUAL ENVIRONMENTS

(71) Applicant: International Business Machines Corporation, Armonk, NY (US)

(72) Inventors: Christopher J. Dawson, Arlington, VA (US); Barry M. Graham, Silver Spring, MD (US); Rick A. Hamilton, Charlottesville, VA (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/942,090

(22) Filed: Jul. 15, 2013

(65) Prior Publication Data

US 2013/0300762 A1 Nov. 14, 2013

Related U.S. Application Data

(63) Continuation of application No. 12/549,611, filed on Aug. 28, 2009.

(51) Int. Cl.
*G09G 5/00* (2006.01)

(52) U.S. Cl.
USPC .......................... 345/428; 345/619; 345/661

(58) Field of Classification Search
None
See application file for complete search history.

(56) References Cited

U.S. PATENT DOCUMENTS

| | | | |
|---|---|---|---|
| 5,736,982 A * | 4/1998 | Suzuki et al. | 715/706 |
| 6,396,509 B1 * | 5/2002 | Cheng | 715/706 |
| 6,672,961 B1 * | 1/2004 | Uzun | 463/31 |
| 7,269,632 B2 | 9/2007 | Edeker et al. | |
| 8,441,475 B2 * | 5/2013 | Hamilton et al. | 345/419 |
| 2006/0068917 A1 * | 3/2006 | Snoddy et al. | 463/42 |

* cited by examiner

*Primary Examiner* — Said Broome
(74) *Attorney, Agent, or Firm* — Whitham, Curtis, Christofferson & Cook, P.C.; Lisa J. Ulrich (57) ABSTRACT

Upon a request for a teleportation operation, a user of a virtual universe is provided with an interface for specification of image resolution parameters for initial rendering of a teleportation destination and the user's avatar which are degraded from a full resolution rendering of the teleportation destination and avatar. Degradation of resolution can be in regard to any of a plurality of image qualities such as spatial resolution, temporal resolution colors or color depth, light modeling and rendering style or the like or combinations thereof. Alternatively, a degraded copy of the teleportation destination can be provided as an alternative initial teleportation destination image. Since a rendering of a degraded image can be done with reduced response time, the user is thus provided with full control over a trade-off between image quality and response time and teleportation operations are thus encouraged.

19 Claims, 5 Drawing Sheets

Figure 4B
LOW RESOLUTION
RENDERING TIME = 0.01 A.U.

Figure 4A
FULL RESOLUTION
RENDERING TIME = 1 A.U.

Figure 5

TELEPORT PREVIEW PROVISIONING IN VIRTUAL ENVIRONMENTS

CROSS-REFERENCE TO RELATED APPLICATIONS

This application is a continuation of U.S. patent application Ser. No. 12/549,611, filed Aug. 28, 2009, which is hereby incorporated by reference in its entirety and priority of the filing date of which is hereby claimed.

FIELD OF THE INVENTION

The present invention generally relates to the production and management of interactive virtual universes presented to users on computers linked by a network and, more particularly, to providing previews of teleportation destinations and reduction of the processing burden associated with teleportation.

BACKGROUND OF THE INVENTION

Closely following the introduction of computer generated graphic representations of objects, computers games have been developed and have become popular to the point of becoming a significant industry. A significant factor in the continuing popularity of such games may possibly be the fact that the simulated venue or environment in which the game is played is limited only by the imagination of the game developer and can be presented to a viewer on a display with a realistic appearance which is limited only by the hardware and software employed to render associated images. Moreover, such simulated environments may be changed at will and very rapidly with rules of the game often being altered with the simulated environment. Connection of computers through networks such as the Internet have also allowed interactive participation in the same game simultaneously or at will by numerous participants.

As a synthesis of such games with other capabilities of the Internet such as interactive chat rooms, advertising and marketing and access to massive amounts of information and the like, so-called virtual universes (sometimes referred to as "metaverses" or "3D Internet") have been developed and made available to the public in recent years. A virtual universe (VU) is a computer-based simulated environment intended for users thereof (referred to as "residents" or "agents") to inhabit, traverse and interact through the use of avatars. An avatar, in the context of a VU, is a graphical representation of a user which has an appearance that is freely selectable that the user can control and other participants can see, often taking the form of a cartoon-like human which can move through the regions of the virtual universe represented by 3D graphics and landscapes. Such 3D graphics and virtual landscapes may or may not resemble the real world in terms of physical laws, building environments, geography and landscapes. Some examples of virtual universes available to the public include Second Life® ("Second Life" is a trademark of Linden Research, Inc. in the United States and/or other countries), Entropia Universe™ ("Entropia Universe" is a trademark of Mindark PE AB in Sweden and/or other countries), and There® ("There" is a trademark of Forterra Systems, Inc. in the United States and/or other countries). Examples of massively multiplayer online games include EverQuest® ("EverQuest" is a trademark of Sony Online Entertainment, LLC in the United States and/or other countries), Ultima Online® ("Ultima Online" is a trademark of Electronic Arts, Inc. in the United States and/or other countries) or World of Warcraft World of Warcraft® ("World of Warcraft" is a trademark of Blizzard Entertainment, Inc. in the United States and/or other countries). Publically available virtual universes and/or massively multiplayer online games are operated by persons or companies who provide servers to generate portions of the VU and which may impose a charge for participation as a resident, to establish a particular object or environment (sometimes referred to as an "island") within the VU, present advertising and the like or combinations thereof. In short, an avatar controlled by a resident can interact with other avatars, objects and portions of the immediate environment of the avatar in much the same way a person would interact with other persons, objects and portions of the environment in the real world but where transportation between portions of the VU may be nearly instantaneous (e.g. referred to as "teleporting") and objects and local environments within the VU may be entirely developed at will to resemble the real world closely, not at all or with any degree of realism or fantasy in between which may be provided by the administrator of the VU or users of the VU, often for a not insubstantial fee. Further, once such objects or local environments become part of a VU, fees can be charged for use made of them through avatars. On the other hand, many entities have found it advantageous to provide environments closely resembling real world facilities or locales to allow users to experience, though avatars and with a significant degree of realism, particular locales in the real world and a sampling of the likely inhabitants thereof.

While teleporting may ideally provide a nearly instantaneous relocation of an avatar over potentially great distances within the geography of a VU or between virtual universes, in practice, substantial delays are often encountered in doing so. Teleportation of an avatar involves not only rendering of the avatar in a new environment but also transfer of significant amounts of data between processors of a network while both processes are very computationally intensive and may involve communication of large amounts of data.

SUMMARY OF THE INVENTION

It is therefore an object of the present invention to provide a method and apparatus, preferably embodied in software to reduce the computational and communications burden of teleportation.

In order to accomplish these and other objects of the invention, a method is provided for improving response time of a teleportation operation in a virtual universe system comprising steps of storing image resolution parameters at a client processor corresponding to an avatar of the virtual universe, in response to a teleport operation request to a teleportation destination, confirming that the image resolution parameters are acceptable to a user for rendering an image of the avatar and teleportation destination or changing the image resolution parameters, and rendering an image of the avatar and teleportation destination in the course of the requested teleportation operation in accordance with resolution parameters determined in the confirming step.

In accordance with another aspect of the invention, a virtual universe system is provided including a client configuration panel for storing image resolution parameters at a client processor corresponding to an avatar, a teleport request control for generating an interface in response to a teleport operation request to a teleportation destination and prompting a user to confirm that the image resolution parameters are acceptable for rendering an image of the avatar and teleportation destination or changing the image resolution parameters, and an arrangement for rendering an image of the avatar and teleportation destination in the course of the requested teleportation operation in accordance with resolution parameters determined using the interface.

In accordance with a further aspect of the invention, a method of operating a virtual universe system is provided in which teleportation is encouraged comprising steps of providing an interface for a user to specify image resolution parameters which are degraded from full resolution of a teleportation destination but acceptable to the user for initial rendering of an image of a teleportation destination and an avatar, and providing an image of the teleportation destination and avatar which is rendered in accordance with said degraded image parameters or an image of a degraded copy of said teleportation destination.

In accordance with yet another aspect of the invention, a computer program product is provided comprising a machine readable medium or communication link, said machine readable medium or communication link containing signals comprising a program which, when run on a processor, causes said processor to perform steps of: prompting a user to store image resolution parameters at a client processor corresponding to an avatar of said virtual universe; in response to a teleport operation request to a teleportation destination for said avatar, confirming that said image resolution parameters are acceptable to a user for rendering an image of said avatar and said teleportation destination or changing said image resolution parameters; and rendering an image of said avatar and said teleportation destination in the course of said teleportation operation in accordance with resolution parameters determined in said confirming step.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
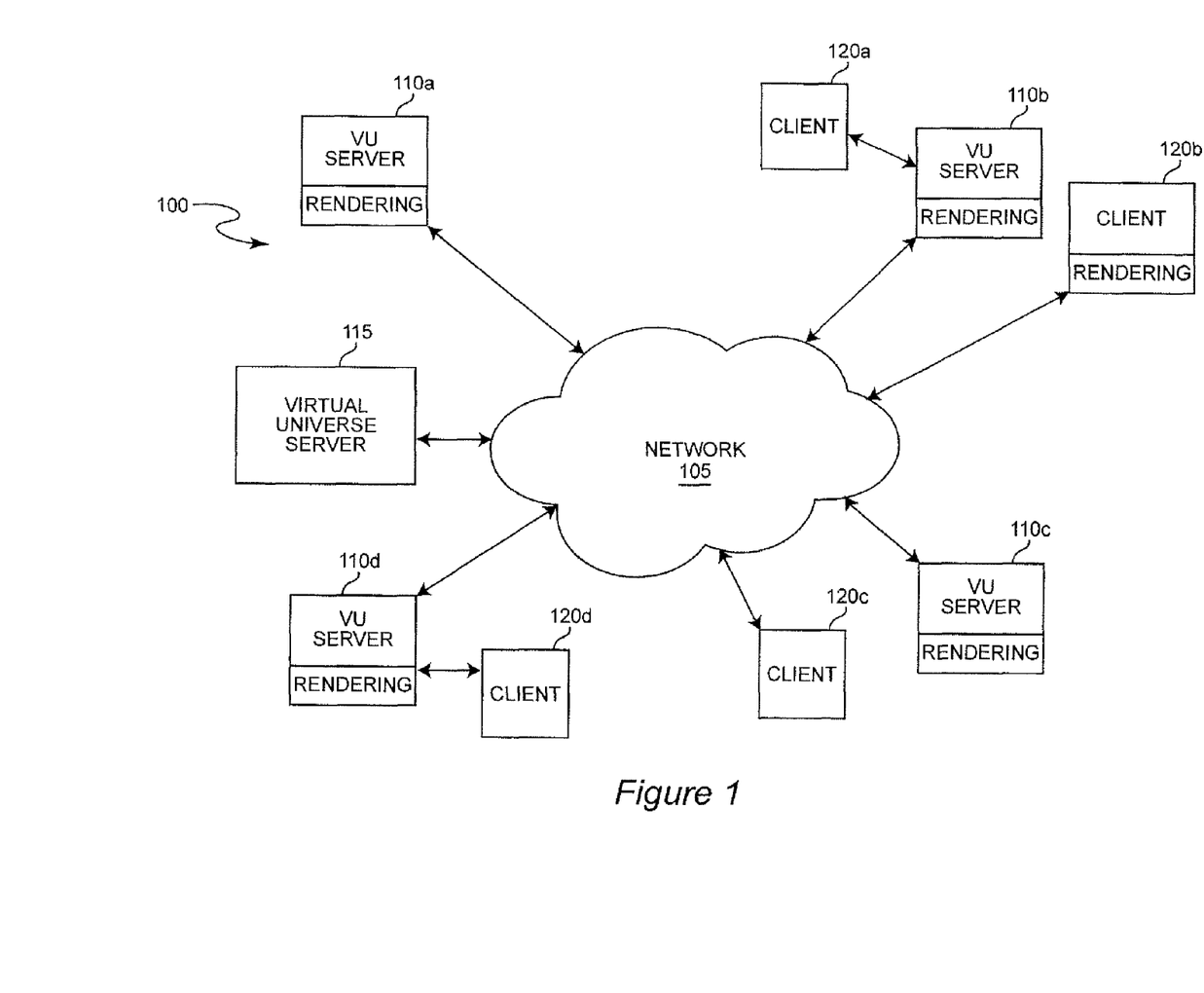
FIG. 1 is a high-level block diagram or data flow diagram of a network-based virtual universe.
Figure 2:
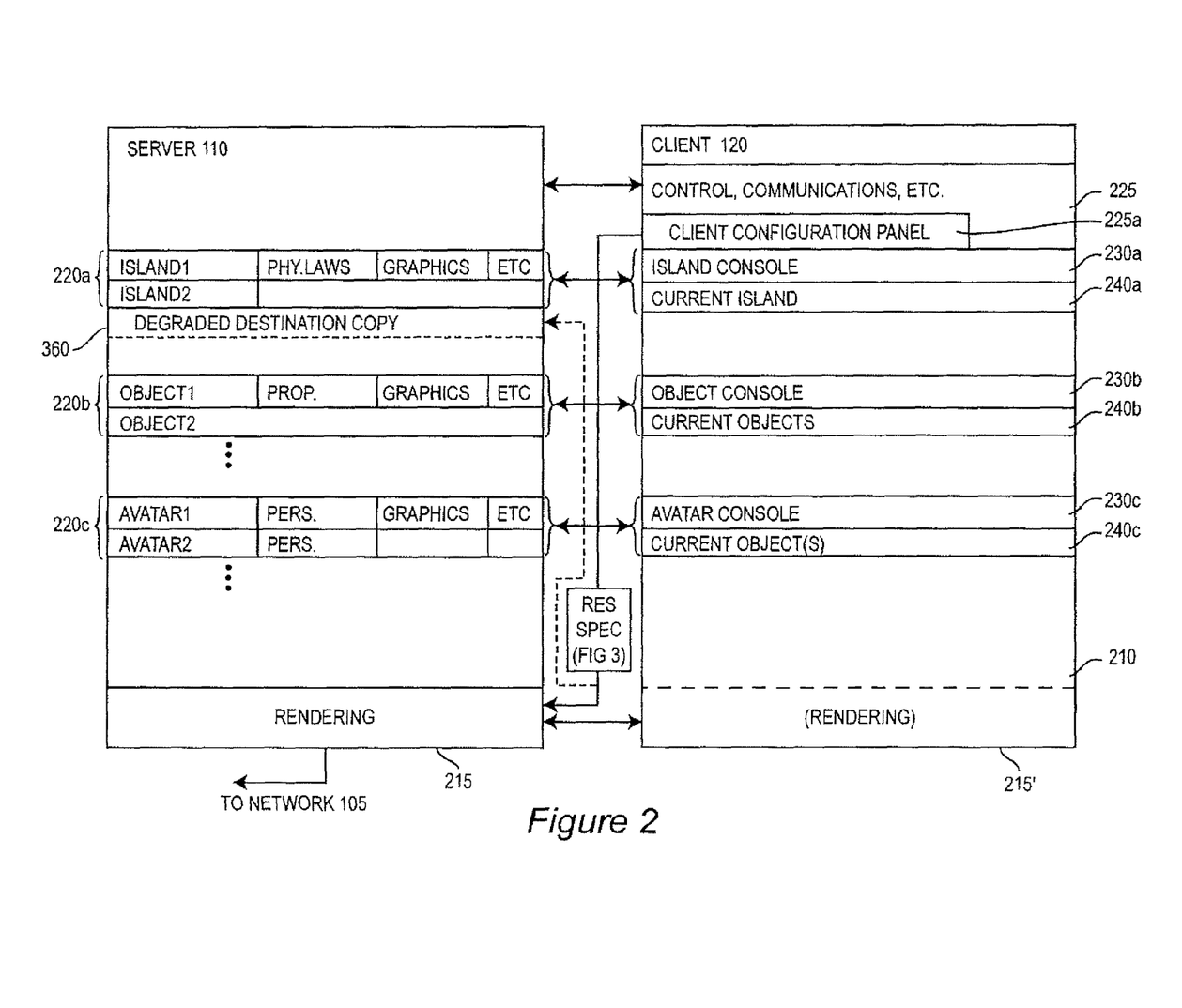
FIG. 2 is a similarly high-level block diagram of some details of the client 120 and server 110 generally provided for participation in a virtual universe.

Referring now to the drawings, and more particularly to FIG. 1, there is shown a high-level diagram of a network implementing a virtual universe (VU). FIG. 2 is a similarly high-level block diagram illustrating functional relationships between a client terminal and a server implementing a VU and between which network 105 may or may not be interposed. FIGS. 1-2 are principally arranged to facilitate an understanding of the overall general operation of a virtual universe and do not and are not intended to represent any particular known implementation of a VU. Further, at the level of abstraction with which a VU is represented in FIG. 1, the VU illustrated may or may not include the invention and no portion of FIG. 1 or 2 is admitted to be prior art in regard to the invention. It should also be borne in mind that VU implementations have become relatively sophisticated and the underlying technology relatively mature such that enhancements thereto, such as those provided by the present invention, must be interoperable with existing network and VU infrastructure.

It should also be recognized that operation of a VU is extremely processing intensive and, while large amounts of computing resources may be accessible through a network, graphics generation and rendering must be distributed and managed in such a way as to provide images of portions of the VU in a very short period of time in order to be acceptable to residents of the VU, particularly in regard to updating views as avatars are manipulated and as teleportation between islands of the VU occur. Further, substantial portions of the control of avatars must be automated in order to keep the manipulation effort required of a resident within reasonable bounds while providing meaningful and reasonably logical and realistic interactions with environments, objects and other avatars. Thus, to reduce the number of avatar control parameters which must be controlled by a user to a practical level, each environment/island, object and avatar must be personalized (e.g. have an identity including ownership, personality, behaviors, and the like) as well as many properties and attributes (e.g. behaviors, properties and defaults) which must be transmitted efficiently, generally as metadata, between potentially a large number of processors which perform the rendering thereof and the rendering distributed in some form (e.g. compressed video) to the terminals through which residents interact with the VU.

Figure 5:
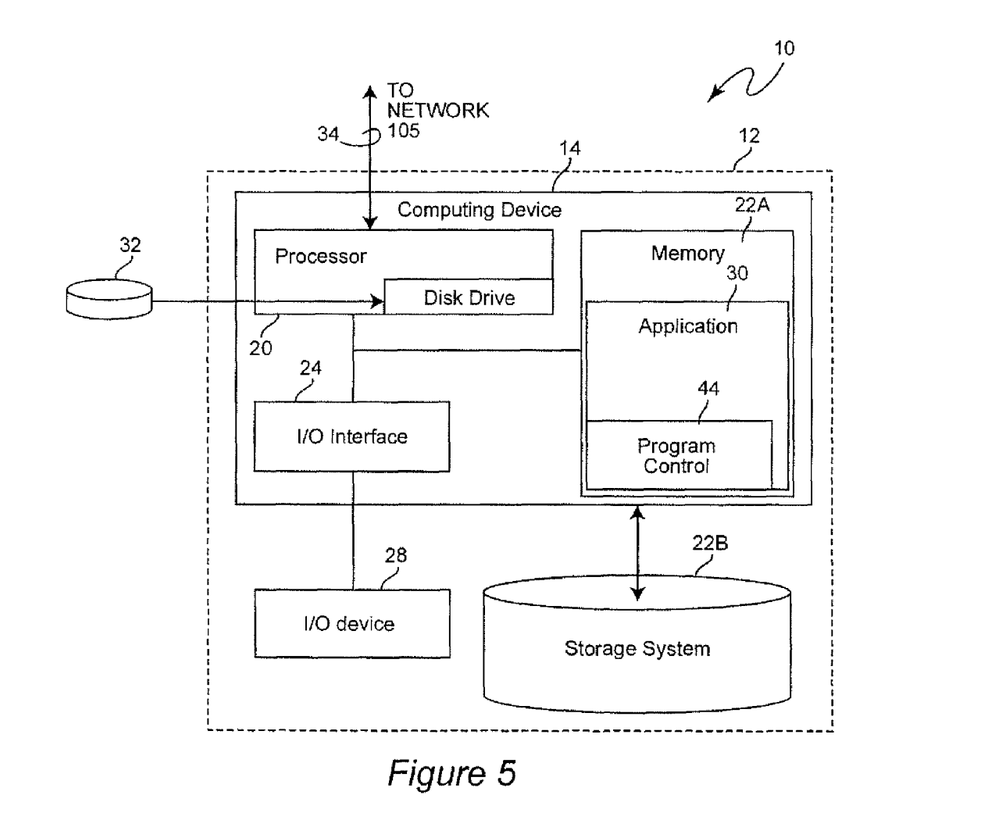
FIG. 5 illustrates a suitable processor architecture for use as a server or client in FIG. 1.

More specifically, as illustrated in FIG. 1, the overall network and system 100 will be recognized as substantially the same as that of the Internet. Other functional elements such as firewalls, proxies and the like may be included for purposes of security, reliability and the like but are not important to the successful practice of the invention. Network 105, such as the Internet, provides communications between all VU servers 110a-110d and at least one virtual universe server 115 which establishes the basic VU topology, characteristics, rules and the like and maintains membership and billing information in regard to residents (users). Clients 120a-120d are essentially user terminals and may communicate with the network 105 and VU server 115 either directly or through a VU server although that distinction is unimportant to the practice of the invention, as well. A suitable processor architecture is illustrated in FIG. 5 and discussed below.

Referring now also to FIG. 2 the nature of communications generally depicted in FIG. 1 will be explained in greater detail but also with a degree of generality since many variations thereof may be employed. It will be readily understood by those skilled in the art that rendering of islands, avatars, objects and the like is perhaps the most processing intensive aspect of a virtual universe as well as being the most time-critical for performance which is acceptable to the user. Hardware, software and firmware for performing rendering is generally resident in each VU server 110 and the virtual universe server 115 of FIG. 1 but may be present to some degree (e.g. a graphics co-processor) at a client terminal 120 as depicted by dashed line 210 and parentheses in FIG. 2. In general, the servers 110, 115 will have the capability of arbitrating the most convenient/available location for rendering to be done most expeditiously. For example, when rendering is required at, for example, client 120a for interaction of a particular avatar with an object while changing location on an island, the rendering (including occlusion or hidden line processing)

could be performed at the local server 110*b* or distributed over any or all of servers 110*a*-110*d* and possibly even including some client terminals (e.g. 120*b*) having rendering capability 215' depending on rendering complexity (e.g. required detail) and current processing loads of VU servers and clients. It should be appreciated that plural avatars for plural residents/users may be present in the same environment and that a different point of view may be required for the rendering presented to each resident/user.

Thus, the graphics to be presented to a user may be transmitted as a rendering to the network or a local client from a server (e.g. as compressed graphics which may or may not be further modified at a local server or client processor) or, if rendering of avatars, objects or islands resident on a particular server are to be rendered on another processor, attributes such as the identity, physical laws, graphics definitions (e.g. primitives), etc. of an island, the identity, properties, graphics definitions, etc. of an object and/or personality, ratings, graphics definitions, etc. of an avatar are stored, preferably as metadata in servers 110 and transmitted as such to the processor which will actually perform the rendering and retransmission of the graphics. It should be appreciated that such attributes will be either constant or only infrequently or slowly changing and thus would be impractical and distracting to specify with each avatar command but can be automatically transmitted and retransmitted between servers, as needed, with avatar commands, controls and/or communications specified by the user/resident.

It should also be appreciated that client 120 will have appropriate controls and communications facilities (which are not generally hardware-dependent but can use available hardware interfaces such as a keyboard, mouse, camera, microphone or the like) collectively depicted at 225 of FIG. 2 which will preferably be resident on the client processor. Client terminal 120 will also include a client configuration panel 225*a* which will maintain various settings in regard to how the client terminal will respond to various inputs such as the sensitivity to mouse movements or particular definitions of actions for different, customized keystroke combinations.

In order to create islands, objects and avatars, some arrangement for doing so, preferably a graphic user interface (GUI) which may be in the form of one or more screens (possibly nested) functioning as a console 230*a*-230*c* may also be resident but are preferably downloaded from virtual universe server 115 through the local server for control of use thereof since fees may be charged for creation and addition of islands, objects and avatars to the VU. Such consoles allow particular attributes (e.g. locations, properties, personalities, graphics definitions and the like) to be specified and which are thereafter stored, preferably on an associated server 110 as depicted at 220*a*, 220*b* and 220*c* for islands, objects and avatars, respectively, or VU server 115. Similar GUIs 240*a*-240*c* are also provided (but preferably resident on the client processor) for control of the current island, object and/or avatar, once it has been created. Suitable arrangements for providing GUIs or consoles 230*a*-230*c* and GUIs 240 are known and others providing enhanced user/resident convenience are foreseeable. The current island (220*a*) with its associated objects (220*b*) correspond to the current location of the current avatar (220*c*) and are thus the object of teleportation or relocation invitations to which the present invention is directed as will now be discussed.

Some definitions which will be helpful in the following discussion are:

1. Avatar—an avatar is a graphical representation the user/resident selects that others can see, often taking the form of a cartoon-like human but which can be produced with any degree of detail, whether realistic or fanciful;

2. Agent—an agent is the user's account, upon which the user/resident can build an avatar and which is tied to an inventory of assets the user creates and/or owns;

3. Region—a region is a virtual area of land (e.g. a portion of an island or an environment associated therewith, such as an interior space in a building) within the virtual universe which typically resides on a single server;

4. Landmarks—a landmark is a map location that can be saved by a user (much in the manner of a "bookmark" in the Internet) and typically comprises a name and a map coordinate within the VU;

5. Friend/contact—a friend or contact is another user/resident of the VU which is maintained in one or more lists which allows a user to see when friends or prior contacts are online and provides a mechanism for contacting them directly using tools available with the list. It should also be appreciated that assets, avatars, the environment corresponding to a location and anything else visible in the virtual environment comprises universal unique identifiers (UUIDs) tied to geometric data (preferably distributed to users as textual coordinates), textures (preferably distributed to users as graphics files such as JPEG 2000 files) and effects data (preferably rendered by the user's client processor according to the user's preferences and user's device capabilities but could be otherwise rendered as discussed above).

Virtual universes may be traversed by such methods as walking, flying or teleporting. Generally, walking and flying provide for traversal of areas within an island while teleporting provides a mechanism to travel rapidly from one VU location to another VU location even if the locations are geographically (e.g. in the context of the topology of a particular VU) far apart such as on different islands or even in different virtual universes. As indicated above, a user can teleport an associated avatar to any other location of which he may be aware. However, since a major feature of virtual universes is to allow avatars of different users to interact as well as to increase user awareness of additional locations that may be of interest, one user may issue an invitation to another user in the form of an offer of teleporting an avatar of the recipient from the current location of the recipient's avatar to another location. Known systems allow a recipient to accept or reject the invitation/offer of teleporting. If accepted, the avatar of the recipient is teleported from its current location to a location corresponding to the invitation/offer. Accordingly, a teleportation operation will generally require rendering to be performed at a different location or redistributed among processors depending on the incremental change in processing load the teleport operation represents.

As alluded to above, the teleporting operation must be completed in an acceptably short time to avoid compromising the quality of the VU experience for a user. However, a teleport operation involves at least performing a new rendering of the avatar in the new environment of the teleport destination as well as bookmarking/landmarking the avatar's original location to facilitate return, transferring metadata of the avatar and associated objects traveling with the avatar and metadata of the destination environment and object therein between servers depending on current processor load, exchange and processing of authorization and authentication security data and the like, routing of the rendered image or portions thereof to the client processor and associated image generation; all of which are processing intensive operations and may involve transmission of a substantial volume of data in addition to the substantial amount of processing required to manage the presence and interactions of many avatars and objects distributed through the many regions of a virtual universe as well as the burden of continual creation of islands, objects and avatars as a VU evolves.

Nevertheless, the volume and frequency of teleport requests and invitations is generally high in a VU because, at the present state of the art, teleporting to a destination is the only mechanism generally provided for viewing or experiencing in any way the environment of a teleport destination (although an arrangement for providing a single image of an entry point of a destination across which a user can visually pan but without teleportation to support any avatar movement or interaction with the destination is disclosed in U.S. Pat. No. 7,269,632 to Edeker et al.) while there are many reasons a teleport destination may not be found acceptable or desirable to an avatar and associated resident. For example, the environment of a destination or the types of activities to be found there may be contrary to a resident's expectations or preferences, the destination may be excessively crowded (which is also a factor in VU system management since crowding increases the burden of rendering a new environment including all avatars that may be currently present), particular avatars or characteristics or behaviors of avatars which may be present at a destination (e.g. so-called griefers which are avatars that principally behave in a disruptive manner), dangers to the avatar presented by the destination and the like. Thus, teleportation to a destination is often followed rapidly by a return teleportation when the destination is found, as is often the case, to be unsuitable. Such full teleportation (e.g. as provided by known systems requiring the above processing and communications) "round trips" are particularly burdensome to the VU system and cause delays or even compromise the integrity and capability of the system to function acceptably or at all.

While teleportation requests may be relatively great in number as avatars explore the ever-changing extent of a VU, some presences in the VU may be provided or owned for business reasons where the owner wishes as many avatars as possible to experience the region which, as alluded to above, may represent and largely emulate a real-world facility. Such regions are, for that reason, to be more highly detailed and present a particularly large rendering burden with long response time. For that reason, users may be reluctant to accept teleportation invitations to such locations. The same is true to some degree for any teleportation destination in a VU; tending to discourage many teleportation operations and compromise the VU experience for users.

The invention addresses this problem by exploiting the fact that the principal processing burden of full teleportation is the rendering process; the complexity of which is largely a function of the resolution of the image to be rendered. Further, the resolution of an image, particularly when generated digitally and/or capable of portraying motion, is affected by the resolution or difference between image values of every perceptible image quality and is not limited to spatial resolution. For example, in addition to spatial resolution in the optical sense (e.g. the number of pixels or patches of the image which are generated and presented, an example of which for rendering a short cylindrical shape such as the well-recognized symbol for a storage system similar to 22B in FIG. 5 is shown, together with approximate rendering time in arbitrary units (A.U.) in FIGS. 4A and 4B at full spatial resolution and low spatial resolution, i.e. reduced by a factor of approximately ten in each coordinate direction, respectively, for comparison), an image will exhibit a color resolution (e.g. the number of distinct colors which may be included in an image). Similarly, synthesized images will also exhibit a fidelity resolution since surfaces having simple or compound curvatures are generally approximated with polygons and more or fewer polygons may be used to form such an approximation. Synthesized images also generally include object/light interactions between surfaces such as reflections, shadows, textures and transparency and/or translucency effects and the like (combinations of such effects sometimes being referred to as modeling due to similarity to lighting effects in photography) which are generally best rendered using computationally intensive ray-tracing techniques but may be rendered with any selected degree of fidelity to analogous real-world objects and light sources. Image sequences portraying motion will exhibit a temporal fidelity in regard to frame rate which affects the perceived smoothness of motion depicted by differences or blurring between successive images in the sequence. Reduction of resolution or fidelity of any of these image qualities may be perceptible to a greater or lesser degree but may not degrade the perceived image to an objectionable degree while potentially greatly reducing the processing and communication requirements for rendering a degraded image. Slight degradation of each of several of such image qualities may also have a substantial impact on processing and communication burdens while causing little or no image degradation that is perceptible by an average user. Moreover, degradation of some aspects of an image may serve to mask degradation of other aspects of the perceived image. For example, degradation of spatial resolution may cause some aliasing (e.g. as is evident in FIG. 4B) or blurring of individual images which may serve to mask some degree of image "jerkiness" which will occur with reduction in frame rate below the so-called flicker fusion frequency of human vision or mask a degree of color depth degradation where reduced numbers of colors (sometimes referred to as color gamut while representing an equally large color space) may cause aliasing in a depiction of a surface where color varies across the surface. Additionally, some degradation of resolution in regard to many of these image qualities may often be masked by interpolation which is well-understood and may be performed autonomously and independently of other image manipulations by simple techniques which are well understood in the display arts.

Moreover, some operational delays may be wholly or partially masked by reduction of some of these aspects of resolution or fidelity. For example, if rendering time can be reduced to a short time approaching a degraded but acceptable frame rate, the rendering time will appear to be substantially instantaneous. Further, if full resolution in regard to any or all aspects of images can be restored on demand or by degrees, degraded image rendering need not have a particularly extended duration before full resolution rendering is utilized; allowing the full resolution rendering to be deferred until after all metadata transfers and image data routing and the like have been completed, thus reducing the immediate impact of processing burden of a teleport operation. Conversely, degraded rendering could be used to reduce processing loads and increase operational margins of the VU system where required without necessarily shifting image processing between processors in a load responsive manner but where changes in load are much less abrupt; tending to reduce communications burdens to accommodate transient changes in processing loads. In short, control of degradation of various image qualities may be managed through facilities provided by and in accordance with principles of operation of the invention in such a way as to greatly reduce processing and communications requirements of teleportation operation and thus greatly improve response time while maintaining, in most instances, image presentation quality which is acceptable to an individual user and with little or no visually perceptible image quality reduction. Further, since teleportation is actually performed in accordance with the invention, full interaction of an avatar with the destination environment and objects and avatars therein is fully supported. Thus teleportation operations are encouraged in accordance with the control over the trade-off between response time and image resolution and the overall VU experience enhanced.

Figure 3:
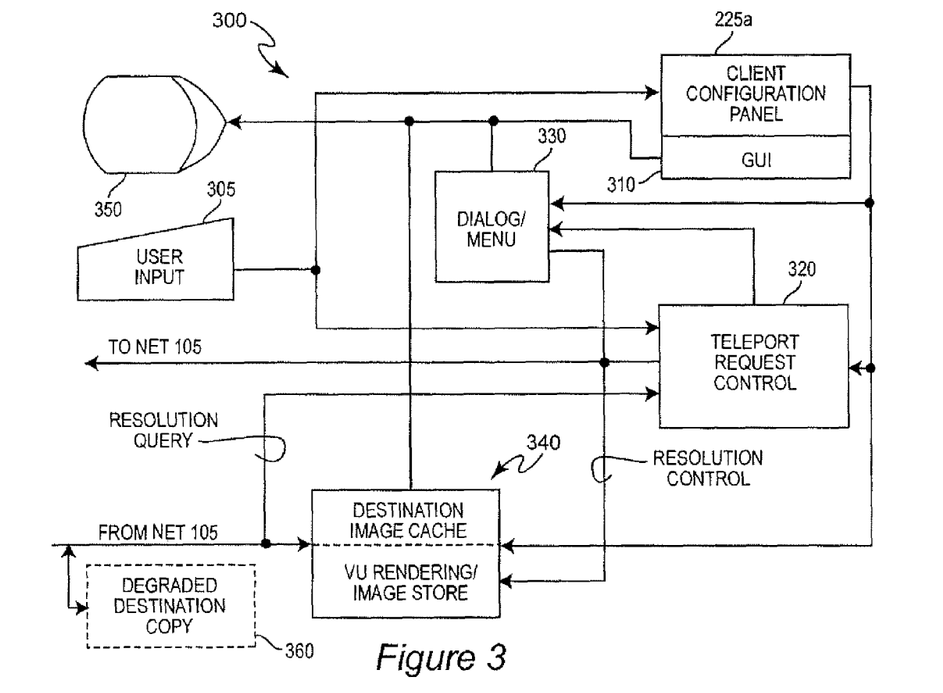
FIG. 3 is a high-level block diagram of an architecture suitable for reducing the computational and communications burden of teleportation to an arbitrary degree.

Referring now to FIG. 3, an exemplary architecture 300 for allowing reduction of processing burdens of teleportation is illustrated. It is to be understood that this architecture is exemplary and many other arrangements will be evident to those skilled in the art in view of the following discussion. Moreover, it is to be understood that the architecture depicted or similar architectures supporting similar functions is preferably implemented in software to assure and enhance interoperability with existing VU infrastructure which is also largely implemented in software. Further, it should be appreciated that the illustration of FIG. 3 can also be understood as a data flow diagram which can be followed in connection with the following discussion of the operation of a preferred implementation and methodology of the invention.

In essence, the present invention allows the resolution of the rendering to be specified from the client processor 120 to allow the user full control of the trade-off between image quality and response time of the VU during actual teleport operations or visits to a teleport destination as illustrated at a high level in FIG. 2 and greater detail in FIG. 3. It will be recalled from the foregoing that a client terminal 120 will include a client configuration panel 225a which is used to capture and store various user preferences in regard to the client processor, in general, and the responses to particular user inputs from input 305 which may be customized by the user. The client configuration panel 225a will preferably have an graphic user interface (GUI) 310 for indicating user preferences to be input and to facilitate capturing such input as it is specified by a user. For purposes of the invention, it is preferred that such user preferences be directed to settings for levels of resolution and fidelity of degraded images presented to the user. The image degradation parameters specified by a user may include (without limitation) spatial resolution, frame rate, number of colors or color depth (e.g. number of bits specifying color), reduced number of polygons used to approximate surfaces, omission or limitation of effects of shadows, light sources, reflections, transparency, textures and the like, reduction of the scene area included in the rendering, degree of detail, style of rendering (e.g. so-called wireframe or outline of an object or, in the alternative, substitution of labels or legends without graphic rendering for some or all objects) and the like. It is contemplated that such parameters may be set to indicate the lowest levels of resolution and fidelity acceptable to the user and/or particular levels of resolution and fidelity which, in combination, optimize the perceived image for a given degree of resolution and fidelity which corresponds to a given fractional reduction in processing burden for teleportation.

This fractional reduction may, in turn, correspond to a particular operating margin of processing load on the VU system which is available as an alternative to transferring processing between networked processors as processing loads increase. Once such data is captured and stored in the client configuration panel 225a, it is available to support normal operations of the invention and to enhance flexibility of operations of the VU system infrastructure. It is also preferred to provide for capture and storage of a time or duration over which a teleport operation initially performed at reduced resolution will be converted to full resolution. In this connection, it should be noted that the principal processing burden of rendering (at a specified resolution) is presented when the initial rendering is performed. Subsequent renderings at increased resolution, while requiring increased processing time, can be expedited and represent somewhat reduced processing loads since some of the information from lower resolution renderings can be used and resolution progressively refined as higher resolution renderings are produced. In any event, it is generally desirable that full resolution renderings corresponding to full teleportation by known VU systems be adopted at some point in time since processing consistency over the VU system can be approached. However, for some environments, reduced resolution may be entirely adequate and, if maintained, can limit communications burdens in the network. Further, it may be desirable to defer any increase in resolution until after a particular amount of time has elapsed without a return teleport operation, since the necessary additional processing for increased resolution would be wasted if the user determined that the destination was unsuitable. Thus, providing the user with the option to specify when or if resolution is increased after a low resolution teleport, in effect, allows a user to maximize acceptability of overall VU system performance at their corresponding client terminal.

Figure 4:
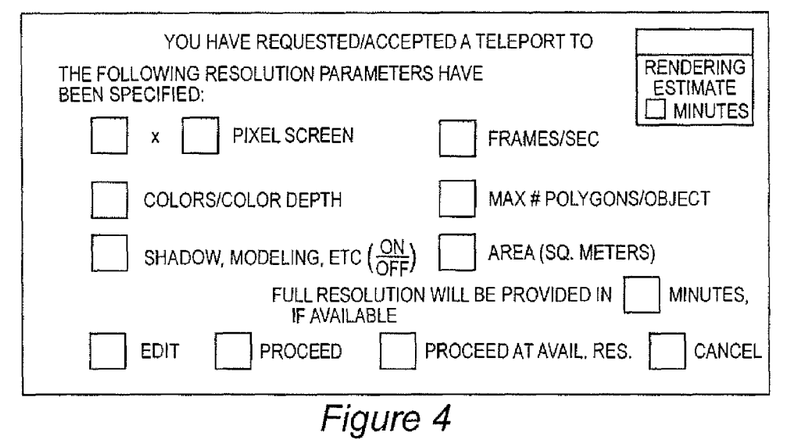
FIG. 4 is an exemplary dialog box or menu usable in connection with a preferred embodiment of the present invention.
Figure 4A:
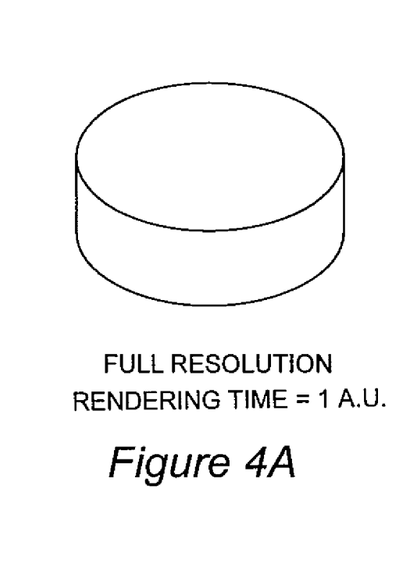
FIGS. 4A and 4B are exemplary images of a short cylindrical shape rendered at full resolution and substantially reduced resolution, respectively.
Figure 4B:
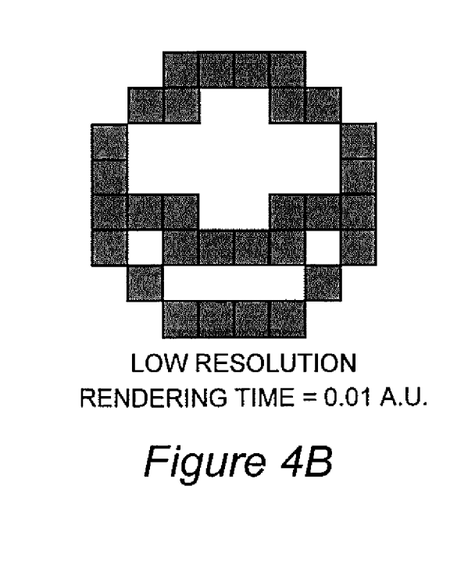

Specifically, in known VU systems the user may request teleportation of the current corresponding avatar to any location of which the user may be aware by appropriate user input from 305. The user may also accept or reject a teleportation invitation received from any other user or agent. Both of these functions are supported by known VU systems. However, in accordance with the present invention, the teleport operation is not immediately executed by an arrangement or programming collectively indicated by teleport request control 320 but, instead, the teleport request control 320 initiates display of a user interface preferably in the form of a dialog box or menu 330 for display to a user on display 350. An exemplary image for the dialog box or menu is illustrated in FIG. 4. Basically, as illustrated in FIG. 4, the dialog box will confirm that a teleportation request has been made and indicate the destination specified in the request. As a perfecting feature of the invention which is not necessary to its practice in accordance with its most basic principles, teleport request control 320 can send an inquiry over network 105 in regard to processing loads in the VU system in connection with the requested destination and can provide an estimate of the time required for full teleportation (e.g. at full resolution as would be provided by known VU systems and this estimate displayed to the user. Further, the data discussed above in regard to acceptable levels of resolution and fidelity are available to the dialog box or menu generator 330 from client configuration panel 225a and can be displayed to the user in connection with the confirmation of the teleport operation request. Finally, with at least the above information presented to the user, the user is presented with the options of accepting full teleportation at full resolution (if available, as alluded to above and discussed in greater detail below), accepting teleportation at reduced resolution (or a choice of several different resolutions and estimated processing times), the option of editing the display resolution parameters (in which case, the estimated rendering time can initially indicate the estimated rendering time with the parameters set in the client configuration panel and which can be changed as parameters are edited to indicate the effect on rendering time) and the option of canceling the teleport operation altogether (as might be desired if estimated processing time at full or reduced resolution was considered to be excessive).

Additionally, at the time of the teleport request, teleport request control 320 sends an inquiry over the network 105 in order to capture and retrieve an existing rendering (e.g. a rendering done in connection with a previous or current avatar visit to the destination, if available and not outdated) or a short sequence thereof which may be cached at storage or rendering engine 340 and which can be played out on a display to the user while the teleportation operation is in process and before the initial rendering incident to a teleport operation is complete and preferably during the period while the teleport request control 320 is awaiting a response from the user to dialog box/menu 330 to provide a preview at the reduced resolution such that the user could determine if the resolution previously set was sufficient for a preview of the destination as well as allowing a user to see an image of the destination for an initial determination of whether or not the destination is suitable. Since the reduced resolution specifications in the client configuration control 225a are preferably made available to the teleport request control 320, the previously set resolution can be requested in the query to capture a rendering of the destination and the rendering can be returned at that resolution, reducing communication time for return of the rendering while providing a sample of the image which is indicative of the quality of the graphics, when rendered. If this optional facility is provided in an embodiment of the invention, it is also preferred to allow the user to modify the resolution specifications previously set such that the modified resolution specifications can be used for the teleport.

If the user wishes to proceed with the teleport either at full resolution or at a reduced resolution determined by confirmation of the resolution parameters set in the client configuration panel 225a, with or without editing, such action can be selected from the dialog box or menu such as that of FIG. 4 and the destination will be rendered at a resolution in accordance with the selection made. Alternatively, instead of directly rendering the destination at degraded resolution, it may be preferable in some circumstances to generate a degraded version or copy 360 of the destination and to initially teleport the avatar to the degraded copy destination. This alternative would be preferable and provide high levels of VU system performance and system efficiency, for example, for destinations which may prove popular and/or normally have a high population of avatars present therein or for other reasons have a high estimated rendering time unless the rendering is highly degraded (e.g. to the point of wireframe renderings of the environment with omissions of a number of environment features and objects such as plants and decorative features and/or providing only labels or legends without rendering to represent avatars or any other level of image degradation that was observed to be popular for initial teleports to a particular destination). In other words, the degraded copy of a destination would be much simplified as compared with the original destination and could be rendered directly with a short response time rather than the original destination being rendered at an altered resolution. In such a case, there would be a high likelihood that a user would find a highly degraded image acceptable in order to view and experience the destination if higher resolution was unavailable or rendering would take an excessive amount of time. In such an alternative embodiment of the invention, the avatar would be teleported to the original, full-resolution destination after a designated time, on request, or when adequate rendering resources were available for full resolution rendering. In this regard, the "proceed at available resolution" option in the dialog box or menu of FIG. 4 could have alternative functions which may be altered in response to the rendering time estimate as compared to a maximum acceptable delay entered with other rendering parameters in client configuration panel 225a. That is, if the rendering time at full resolution or maximum resolution that can be provided under current processing load conditions was less than the selected maximum acceptable time the teleport operation would be to the original destination but, if more than the selected maximum acceptable time, the teleport operation would cause initial teleportation to the degraded version or copy of the destination and transfer to the original destination thereafter in due course.

Thus, to summarize, the user may set resolution specifications thought to be sufficient in the client configuration panel such that such specifications can be used as a default in order to simplify and expedite use of the interface provided by the dialog box/menu 330. These specifications can be modified at will and corresponding estimated response times can, optionally, be provided to the user, consistent with maintaining the possibility of choosing full resolution teleport operation provided by known systems. The user is thus provided with complete control over the trade-off between response time for teleport operations and image quality while allowing full resolution to be resumed during the avatar visit to the teleport destination unless the visit is terminated prior to full resolution being permitted or where degraded images may be deemed sufficient for the entire visit.

From the standpoint of the VU system and its operation, the present invention also provides some operational advantages as alluded to above. It was noted in regard to the VU system as illustrated in FIG. 1 that the processing load is distributed among the client and server processors which are connected by the network and processing in general and rendering in particular may be shifted from one processor to another as processing and communication loads may require. However, the shift of rendering from one processor to another requires the transfer of metadata from which the rendering is performed to be shifted between processors and thus represents additional processing in order to do so. As discussed above, a significant meritorious effect of the invention is to allow a user to reduce the processing load by specifying reduced resolution of rendering in order to reduce system response time which, when implemented generally would, for a given number of users, tend to reduce overall processing demands on the system. Conversely, it was noted above that high processing loads may cause increases in response time beyond what would be considered as acceptable system performance.

While overall system performance will generally be improved through use of the present invention, during periods of high processing load, particular processors having high processing loads may query the client processors corresponding to the avatars they are currently rendering to determine if reduced resolution is acceptable and, if so, what degree of resolution reduction has been specified. The processor can then temporarily reduce rendering resolution (or delay increase of resolution or conversion to full resolution) within the resolution reduction specified corresponding to one or more avatars in order to maintain processing loads within limits and without requiring shifting of processing load to other processors while assuring that any loss of resolution will be within the resolution reduction specified to be acceptable by each user without incurring the processing and communication burden of shifting processing between processors. When it is considered that reductions in resolution can be spread over numerous image parameters and that slight resolution reduction in any given parameter may not be perceptible to a user, it can be appreciated that this meritorious effect of the invention can be highly effective in maintaining operating margins of the VU system as a whole as well as in balancing processing and communication loads.

In view of the foregoing, it is seen that the invention provides for reduction of high processing loads incident to teleportation in a VU system and thus may improve response time and facilitate teleportation operations while allowing full interaction of an avatar with the environment at a teleportation destination. Moreover, the present invention provides some important operational advantages for the overall VU system while allowing a user full control over the trade-off between image quality and system response time to assure acceptable system performance and optimization of the VU experience for each user.

While shown and described herein as a method and a system, it is understood that the invention further provides various alternative embodiments. For example, in one embodiment shown in FIG. 5, the invention provides a computer-readable/useable medium 22B that includes computer program code to enable a computer infrastructure to automatically manage teleportation movements between locations in virtual environments while determining suitability of requested destinations. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc., collectively depicted at 32), or on one or more data storage portions of a computing device, such as the memory 22A and/or the storage system 22B (e.g., a fixed disk, a read-only memory, a random access memory, a cache memory, etc.), and/or as a data signal 34 (e.g., a propagated signal) traveling over a network 105 as depicted in FIG. 1 (e.g., during a wired/wireless electronic distribution of the program code).

Still yet, computer infrastructure 10 is intended to demonstrate that some or all of the components of implementation could be deployed, managed, serviced, etc. by a service provider who offers to implement, deploy, and/or perform the functions of the present invention for automatically managing teleportation movements between locations in virtual environments while determining suitability of requested destinations, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure 12 including computing device 14, such as the computer infrastructure 10 that performs the process steps of the invention for automatically manage teleportation movements between locations in virtual environments while determining suitability of requested destinations, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of an application 30 comprising a set of instructions including program control 44 intended to cause a computing device 20 having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver 24 for a particular computing and/or I/O device 28, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

While the invention has been described in terms of a single preferred embodiment, those skilled in the art will recognize that the invention can be practiced with modification within the spirit and scope of the appended claims.

What is claimed is:

1. A method for improving response time of a teleportation operation in a virtual universe system, said method comprising:

storing image resolution parameters at a client processor, said client processor corresponding to an avatar of said virtual universe;

in response to a teleport operation request to a teleportation destination for said avatar, providing an interface to a user to change said image resolution parameters or to confirm that said image resolution parameters are acceptable to a user for rendering an image of said avatar and said teleportation destination; and rendering an image of said avatar and said teleportation destination in the course of said teleportation operation in accordance with resolution parameters determined in said changing or confirming operations of said step of providing an interface whereby said rendering is selectively performed at full resolution or at reduced resolution in correspondingly reduced time and, if said rendering is performed at reduced resolution, rendering at full resolution is subsequently performed.

2. The method as recited in claim 1, further comprising rendering an image of said avatar and said teleportation destination at full resolution.

3. The method as recited in claim 1, wherein said resolution parameters are set in a client configuration panel of a client processor.

4. The method as recited in claim 1, further including reducing resolution of said step of rendering at full resolution within said rendering parameters determined in said confirming or changing operations in response to processing load at a processor performing said rendering step.

5. A non-transitory computer program product comprising a machine readable storage medium, said machine readable storage medium containing non-transitory instructions comprising a program which, when run on a processor, causes said processor to perform steps of:

prompting a user to store image resolution parameters at a client processor, said client processor corresponding to an avatar of said virtual universe;

in response to a teleport operation request to a teleportation destination for said avatar, providing an interface to a user to change said image resolution parameters or to confirm that said image resolution parameters are acceptable to a user for rendering an image of said avatar and said teleportation destination; and rendering an image of said avatar and said teleportation destination in the course of said teleportation operation in accordance with resolution parameters determined in said changing or confirming operations of said step of providing an interface whereby said rendering is selectively performed at full resolution or at reduced resolution in correspondingly reduced time and, if said rendering is performed at reduced resolution, rendering at full resolution is subsequently performed.

6. The computer program product as recited in claim 5, further comprising a step of
rendering an image of said avatar and said teleportation destination at full resolution.

7. The computer program product as recited in claim 6, wherein said step of rendering and image at full resolution is performed a predetermined time subsequent to said step of rendering in accordance with said resolution parameters determined in said confirming or changing operations.

8. The computer program product as recited in claim 5, wherein said resolution parameters are set in a client configuration panel of a client processor.

9. The computer program product as recited in claim 5, including further signals to perform a further step of
reducing resolution of said step of rendering at full resolution within said rendering parameters determined in said confirming or changing operations in response to processing load at a processor performing said rendering step.

10. The computer program product as recited in claim 5, further including providing a degraded copy of a teleportation destination.

11. The computer program product as recited in claim 10, wherein the teleport operation provides initial teleportation to said degraded copy of a teleportation destination.

12. A virtual universe system including:
a client configuration panel for storing image resolution parameters at a client processor, said client processor corresponding to an avatar of said virtual universe,
a teleport request control for generating an interface in response to a teleport operation request to a teleportation destination for said avatar, said interface prompting a user to confirm that said image resolution parameters are acceptable for rendering an image of said avatar and said teleportation destination or to change said image resolution parameters, and
means for rendering an image of said avatar and said teleportation destination in the course of said teleportation operation in accordance with resolution parameters determined using said interface whereby said rendering is selectively performed at full resolution or at reduced resolution in correspondingly reduced time and, if said rendering is performed at reduced resolution, rendering at full resolution is subsequently performed.

13. The virtual universe system as recited in claim 12, further comprising
means for rendering an image of said avatar and said teleportation destination at full resolution.

14. The virtual universe system as recited in claim 13, wherein said rendering and image at full resolution is performed a predetermined lime subsequent to rendering in accordance with said resolution parameters determined in said operation to confirm or change resolution using said interface.

15. The virtual universe system as recited in claim 12, wherein said resolution parameters are set in a client configuration panel of a client processor.

16. The virtual universe system as recited in claim 12, further including
an arrangement to reduce resolution of said step of rendering at full resolution within said rendering parameters determined in said operation to confirm or change resolution in response to processing load at a processor performing said rendering step.

17. The virtual universe system as recited in claim 12, further including
means for providing a degraded copy of said teleportation destination.

18. A method of operating a virtual universe system in which teleportation is encouraged, said method comprising:
configuring one or more processors for providing an interface for a user to specify image resolution parameters which are degraded from full resolution of a teleportation destination but acceptable to said user for initial rendering of an image of said teleportation destination and an avatar; and
configuring one or more processors for providing an image of said teleportation destination and said avatar which is rendered in accordance with said degraded image parameters or an image of a degraded copy of said teleportation destination,
whereby said image is selectively rendered at full resolution or at reduced resolution in correspondingly reduced time and, if said rendering is performed at reduced resolution, said image is selectively rendered subsequently at full resolution.

19. A method of operating a virtual universe system on a plurality of networked data processors in which teleportation is encouraged, said method including steps of
configuring a client data processor of said plurality of networked data processors to provide
a client configuration panel for storing image resolution parameters at a client processor corresponding to an avatar of said virtual universe, and
a teleport request control for generating an interface in response to a teleport operation request to a teleportation destination for said avatar, said interface prompting a user to confirm that said image resolution parameters are acceptable for rendering an image of said avatar and said teleportation destination or to change said image resolution parameters, and
configuring at least one data processor of said plurality of data processors to provide
apparatus for rendering an image said teleportation destination in the course of said teleportation operation in accordance with resolution parameters determined using said interface,
whereby said image is selectively rendered at full resolution or at reduced resolution in correspondingly reduced time and, if said rendering is performed at reduced resolution, said image is selectively rendered subsequently at full resolution.

* * * * *